Oct. 27, 1970  HIRO J. GULRAJANI  3,535,876

FLOW TRANSDUCER

Filed Feb. 27, 1969

INVENTOR
HIRO J. GULRAJANI

ATTORNEY

United States Patent Office 3,535,876
Patented Oct. 27, 1970

3,535,876
FLOW TRANSDUCER
Hiro J. Gulrajani, Brookfield, Wis., assignor to
The Oilgear Company, Milwaukee, Wis.
Filed Feb. 27, 1969, Ser. No. 802,367
Int. Cl. F15b 15/18
U.S. Cl. 60—52                                  4 Claims

ABSTRACT OF THE DISCLOSURE

A hydraulic transmission having a servo system controlling the displacement of a pump or motor and including a flow transducer operative in response to discharge of fluid through a pressure relief valve to provide a signal to the servo system to vary the displacement so as to minimize the flow through the pressure relief valve.

---

The invention relates to a servo controlled hydraulic transmission protected by a pressure relief valve, the transmission having an operating cycle that tends to cause large amounts of excess pressure fluid to be bypassed through the relief valve, and the transmission includes a flow transducer means that responds to the rate of flow through the relief valve to provide a signal to the servo system so as to vary the displacement of a pump or motor unit for the transmission in a direction so as to minimize the flow through the relief valve.

In such a transmission the flow transducer means is operative to short stroke a variable displacement pump, or to increase the stroke of a variable displacement motor, so as to minimize the flow of excess pressure fluid through the relief valve.

Applications of the flow transducer means in reducing flow of fluid through the pressure relief valve, permits operating at rated pressure or at relief valve pressure setting, and avoids excessive power consumption or waste of power, reduces excessive heat otherwise generated by excess pressure fluid being discharged through the pressure relief valve, provides certain system control such as constant torque or constant horsepower when operating at rated pressure, and permits more efficient use of the relief valve and of coolers for the hydraulic system. It may be said to provide efficient pressure regulation at rated pressure.

In an embodiment of the invention described herein, the flow transducer means employs a modified pressure relief valve and standard components in combination with a conventional servo control system controlling the stroke of a variable displacement unit of a hydraulic transmission. The flow transducer means receives a hydraulic pressure signal generated by flow through the relief valve and converts that hydraulic pressure signal to a pneumatic pressure signal to modify the stroke command of a pneumatic servo stroke control system.

The flow transducer means is particularly applicable to a transmission system in which a load hydraulic motor stalls or cannot absorb the output of a hydraulic pump for an operating condition encountered during a work cycle, for upon encountering such condition the line pressure rises and blows a pressure relief valve which is operative to limit line pressure to a predetermined value.

In a variable displacement pump application, such as a metal extrusion press, the load hydraulic motor is a hydraulic ram, and the initial portion of the extrusion cycle generally requires operation at rated pressure, or the pressure setting of the pressure relief valve. Since the initial rate of extrusion is slower, the pump provides excess pressure fluid which must be bypassed through the pressure relief valve. The flow transducer means serves to reduce the stroke of the pump in accordance with the rate of flow of excess pressure fluid through the relief valve.

It is therefore an object of the present invention to provide a hydraulic transmission, having an operating condition that tends to dump relatively large amounts of excess pressure fluid through a pressure relief valve, with means responsive to the flow through the relief valve to effect a change in the displacement of a pump or motor unit for the transmission in a direction and amount to minimize the flow through the relief valve.

Another object of the invention is to provide a hydraulic transmission with a pressure relief valve with an unloading control circuit that varies pump control to short stroke the pump when the relief valve blows, while maintaining full system pressure.

Another object of the invention is to provide a pneumatic servo system controlling the stroke of a hydraulic pump for an extrusion press, which system includes a flow transducer means to provide a pneumatic signal to short stroke the pump in accordance with the flow of excess pressure fluid through a pressure relief valve.

Other objects and advantages of the invention may be apparent upon a reading of the description taken with the following drawings, in which.

DESCRIPTION

Figure 1:
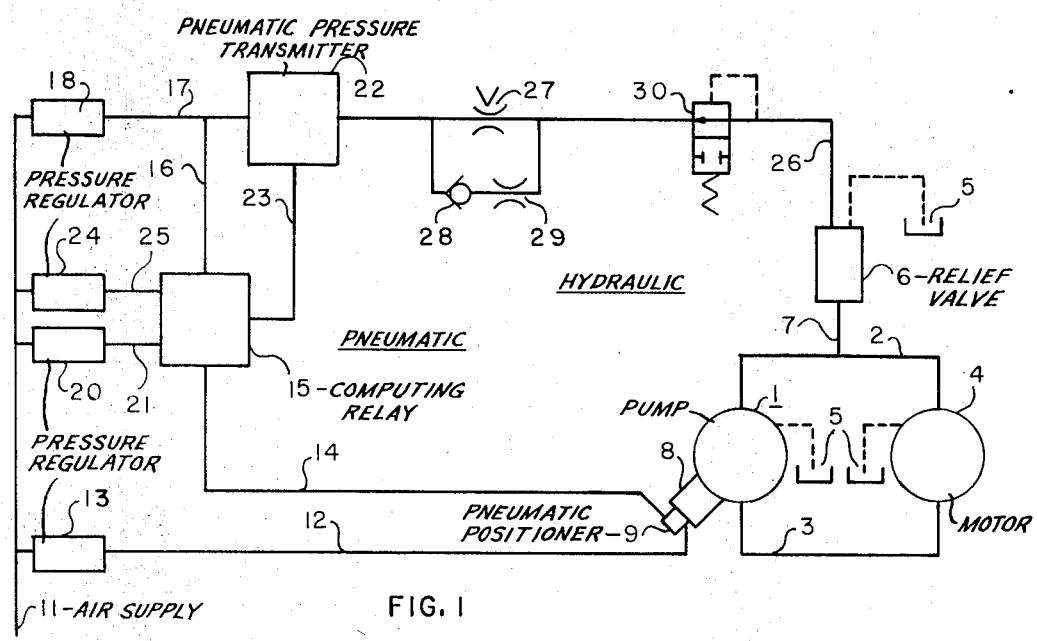
FIG. 1 is a schematic circuit embodying the present invention of a hydraulic transmission having a pneumatic control circuit for a pneumatic controlled variable displacement pump or motor unit protected by a pressure relief valve that generates a flow responsive pressure signal.

A hydraulic transmission shown in FIG. 1 comprises pump and motor units 1, 4, one of which is a servo controlled variable displacement unit. For the convenience of description unit 4 is assumed to be a load hydraulic motor such as a working ram and cylinder of an extrusion press, and unit 1 is a servo controlled variable displacement hydraulic pump hydraulically connected to hydraulic motor 4 by supply line 2 and return line 3. The pump 1 is conventionally connected to a reservoir 5 and to a gear pump, not shown, for providing control pressure fluid.

The transmission is protected by a pressure relief valve 6 whose input line 7 is connected to the output line 2 of the pump to limit the pressure thereof to a predetermined value. When the pressure setting of the relief valve is exceeded, the excess fluid from the transmission is bypassed through the relief valve 6 to the reservoir 5. The discharge of fluid through the relief valve generates a pressure which is utilized in the flow transducer circuit, more particularly described hereinafter.

The displacement of the pump is conventionally determined by a hydraulic cylinder 8 supplied with control pressure fluid through a pilot valve, not shown, which is controlled by a conventional air cylinder 9 so as to provide remote control during the extrusion stroke of the press.

A pneumatic control means includes the air cylinder 9 or so called air positioner, which has a differential area operating piston, not shown, with the smaller area supplied with a fixed source of pneumatic pressure, and the larger area supplied with control pneumatic pressure, all of which may be supplied from pressure regulators connected to a line 11 to a common source of air pressure, not shown, in a manner illustrated in the pneumatic circuit.

The air positioner 9 is connected by a line 12 to a pressure regulator 13 which supplies a fixed pressure to one side of the air positioner piston (not shown) to urge it in one direction. The air positioner 9 is connected by a line 14 to a computing relay 15 which provides an air signal pressure to the other side of the air positioner piston (not shown) to urge it in an opposite direction. A balance of the forces of the spring and pneumatic forces determines the position of the piston of the pneumatic positioner, which in turn positions a pilot valve (not shown) that controls the supply of gear pump control pressure to the pump stroke control piston, in a conventional manner.

The computing relay is a pneumatic relay of the summing type that receives a plurality of pneumatic pressures such as a command pressure and a feedback variable pressure in opposition to reduce the command or output of the relay. The computing relay has a supply input connected by lines 16, 17 to a pressure regulator 18 connected to source line 11 to supply 20 p.s.i. air pressure to the relay. A pressure regulator 20, connected to line source 11, is adjustable to provide a selected air signal pressure between 3 and 15 p.s.i. to a signal input 21 to the relay 15 and serves to determine the pump stroke command signal that the relay transmits to the pneumatic positioner, in a well known manner.

The flow transducer means, hereinbefore referred to, includes a pressure transmitter 22 that has an input air supply also connected by line 17 to pressure regulator 18. The variable output air signal from the pressure transmitter 22 is connected by a line 23 to a signal input to the computing relay 15. Since the output of this pressure transmitter may vary from 3 to 15 p.s.i., the minimum value of the air signal is cancelled in the computing relay by provision of an oppoosing 3 p.s.i. constant pressure provided by a bias source from a pressure regulator 24 connected by a line 25 to an input to the computing relay.

The computing relay 15 conventionally provides an adjustable position of the fulcrum of its flapper plate to provide a gain factor for a variable input signal such as the input signal received from the pressure transmitter 22 with respect to the stroke command signal from regulator 20, so that the variable input signal oppose the stroke command to decrease the output of the computing relay in accordance with increases in the variable input signal.

The pressure transmitter 22 is one of the Bourdon tube type or variations thereof that receives fluid pressure from a reference or variable source and expands or contracts with changes in internal fluid pressure to effect movement of an operator that controls a pneumatic relay which in turn provides an air signal which is proportional to the measured variable fluid pressure. A Foxboro model 44BP pressure transmitter, for example, would receive a regulated air supply of 20 p.s.i. and provide an output pneumatic signal of 3 to 15 p.s.i. as a measure of an input fluid pressure, when calibrated and adjusted to a selected range of operating fluid pressures.

The pressure transmitter 22, FIG. 1, is part of a flow transducer means in which the rate of flow of fluid discharged through relief valve 6 generates a fluid pressure that is transformed by the pressure transmitter to a pneumatic pressure that is a measure of the fluid pressure signal, within the range of fluid pressures selected. The hydraulic pressure for the flow transducer circuit is obtained by a connecting line 26 to a passage that extends into a discharge passage of the pressure relief valve and that presents an opening therein upon which fluid impinges as it is discharged through the pressure relief valve for return to the pump 1 or to the reservoir 5. Fluid impinging upon the opening of the passage to line 26 develops a pressure therein that is a measure of the rate of flow of fluid discharging through the pressure relief valve.

In line 26 between the pressure relief valve and the pressure transmitter 22 are flow and pressure limiting means comprising an adjustable choke 27 shunted by a check valve 28 in series with a fixed choke 29, and in series with the flow limiting means such as a safety valve 30 that limits the pressure transmitted to a predetermined value.

The adjustable choke 27 limits the rate of change at which the pressure signal may be applied to the transmitter 22, since check valve 28 blocks flow through choke 29 to the transmitter. The check valve 28 permits return flow through choke 29 and there is return flow as well through adjustable choke 27, and the parallel connected chokes 27, 29 limit the rate of return of the pressure fluid to the relief valve when the generated pressure decreases in value.

In operation of the transmission the flow transducer is operative to effect the pneumatic control of the pump only when there is a flow through the pressure relief valve. If the pump supplies more fluid than the hydraulic motor can absorb, the transmission pressure rises until limited by discharge through the relief valve which then generates a reference pressure in the flow transducer circuit and the pressure transmitter responds and provides a pneumatic pressure signal to relay 15 to cause a change in the stroke command signal that reduces pump output and thereby reduces the flow of pressure fluid through the pressure relief valve. As the flow of excess fluid through the relief diminishes, the signal applied by the flow transducer means to the computing relay also diminishes and the pump stroke returns toward that of the preset command from the stroke command pressure regulator. The flow transducer means thus would tend to modulate the stroke command for a greatly reduced flow through the pressure relief valve.

Figure 2:
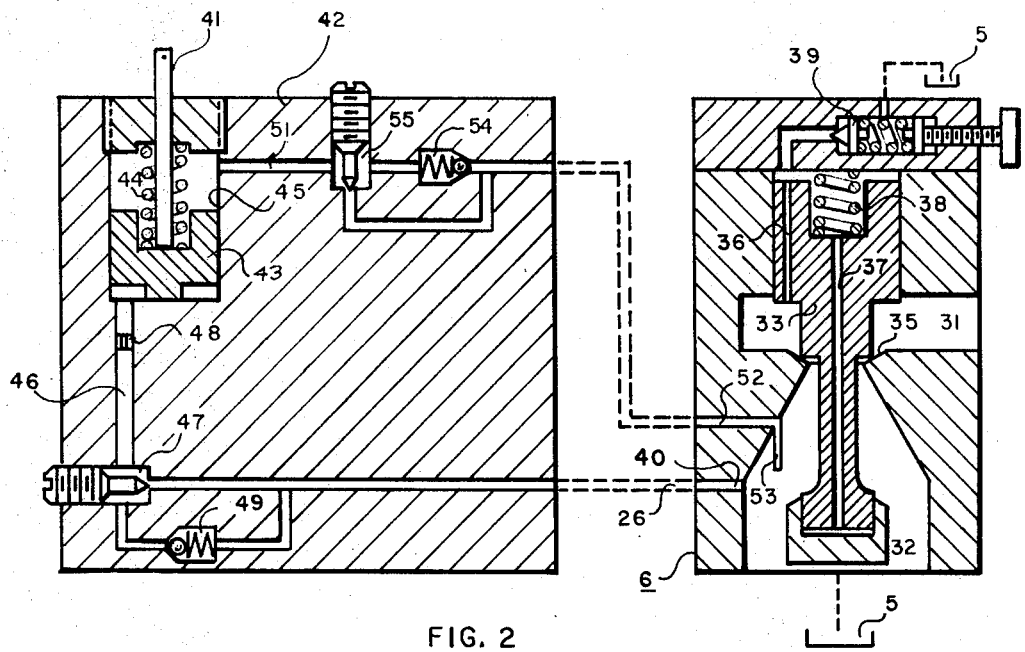
FIG. 2 is a schematic illustration of flow transducer means including the pressure relief valve of FIG. 1 to convert its flow responsive pressure signal to a displacement signal.

The pressure relief valve 6 represented in FIG. 1 is preferably a pilot operated pressure balanced type structurally illustrated by the relief valve 6 in FIG. 2. Relief valve 6 has an inlet port 31 and an outlet port 32, a valve chamber containing a valve member having a large piston 33, a small piston 34, and a valve seat 35 intermediate the pistons. Line pressure to the inlet chamber 31 is conducted through a flow limiting passage 36 to the valve chamber at the end of the large piston 33 and through a central passage 37 to the end of the large piston 34. The valve member is biased to closed position by a spring 38. A pilot valve 39 in an end head for the relief valve is adjustable to open at a selected pressure setting to drain fluid from the valve chamber at the end of the large piston which would cause opening of the valve.

Line 26 of the flow transducer circuit extends as a lateral passage into the relief valve and has an opening 40 in the discharge passage, relatively close to the valve seat, so that the high velocity of fluid discharging across the valve seat and into the discharge passage impinges upon the opening 40 and produces a pressure in line 26 which is a measure of the rate of flow of fluid discharging through the pressure relief valve 6.

FIG. 2 illustrates a flow transducer comprising relief valve 6 and an operator assembly 42 to obtain mechanical displacement of an operator 41 in accordance with the rate of flow of excess pressure fluid being discharged through the pressure relief valve 6.

The operator 41 may be coupled to a movable member of a pressure transmitter to vary its output in accordance with the position of the operator or the operator may be coupled to the movable element of a linear variable displacement transformer to vary its output in accordance with the position of the operator. In either case, the position of the operator 41 may be used to generate a signal for a feedback signal device in a servo control system controlling the stroke of a variable displacement hydraulic pump, so as to reduce the stroke of the pump in accordance with the displacement of the operator from its normal position as illustrated in FIG. 2. The operator 41 is part of a flow transducer block 42 adapted for close mounting with the pressure relief valve. The operator 41 comprises an operating stem extending from a piston 43 shown biased by a spring 44 to a bottom position of its associated cylinder 45. The bottom of the cylinder is hydraulically connected through a line 46 to the line passage 26 in the discharge flow passage of the pressure relief valve, so that a pressure in said line is transmitted to the bottom of the operator piston. Such pressure fluid admitted to the bottom of the operator piston cylinder 45 passes hrough an adjustable choke 47 and a fixed choke 48. The adjustable choke 47 is positioned to adjust the speed of lift of the operator so as to adjust the speed of reducing the pump stroke and the fixed choke 48 in series therewith is provided so that the rate of flow of such reference pressure to the bottom of the operator piston is limited to a reasonable amount in the event the adjustable choke were opened too much. Pressure fluid can return from the bottom of the operator cylinder through the fixed choke and through a free flow check valve 49 to the return passage of the pressure relief valve. The fixed choke thus also serves to limit the rate of increase of the pump stroke as the reference pressure signal falls off.

The reference or flow responsive pressure is thus admitted to the bottom of the cylinder 45 tending to raise the piston against the force of its bias spring. The spring side of the cylinder is also connected to a passage 51 in the flow transducer block which is connected to a passage 52 in the relief valve that opens in the flow discharge passage of the relief valve with the opening therein facing in the direction of flow of fluid discharging through the relief valve in a manner such as provided by a pipe 53 that extends in the flow discharge passage in the direction of flow, so that the pressure developed therein is responsive to the back pressure existing in the flow discharge passage 32. The back pressure is transmitted through a free flow check valve 54 to the upper end of the operator cylinder 45. The return of back pressure fluid from the operator cylinder is blocked by the check valve 54 and flows through an adjustable choke 55 to return to the discharge passage 32 of the pressure relief valve. This adjustable choke 55 also serves to limit overshooting of the operator piston.

Thus the displacement of the operator 41 corresponds to the rate of flow of fluid through the pressure relief valve, and the displacement of the operator may be transduced to a suitable signal for insertion in the circuit controlling the stroke of the pump, such as illustrated in FIG. 1.

Other changes may readily be made in the invention illustrated within the scope of the invention claimed.

I claim:

1. In a pneumatic servo control system for selecting and controlling the displacement of a variable displacement hydraulic pump that supplies pressure fluid to a load hydraulic motor protected by a pressure relief valve that bypasses excess pressure fluid to limit the pressure of the fluid supplied to the load hydraulic motor to a predetermined value, said pneumatic control system including a pneumatic computing relay whose pneumatic signal output is proportional to the sum or difference of two or more pneumatic signal inputs and whose output determines the displacement of the pump, one of said pneumatic signal inputs being responsive to a flow transducer operative when excess pressure fluid is discharged through the pressure relief valve, and said flow transducer comprising a pressure transmitter whose pneumatic output is connected to a signal input to said computing relay and whose hydraulic signal input is connected to a lateral passage that extends into the discharge passage of the pressure relief valve and positioned therein so that fluid discharging across the valve seat of the relief valve impinges upon an opening to said lateral passage thereby generating a pressure in said lateral passage and to the hydraulic input of the pressure transmitter that is a measure of the rate of flow of fluid discharging through the relief valve, and flow restricting and pressure limiting means in said lateral passage to limit the rate of change and the maximum pressure thus transmitted to the hydraulic input of said pressure transmitter.

2. In a hydraulic transmission having a servo system controlling the stroke of a variable displacement pump and having a pressure relief valve to limit transmission pressure to a predetermined value, a flow transducer means including an input passage hydraulically connected to a passage having an opening in the discharge passage of the relief valve so that fluid discharging through the relief valve impinges upon said opening and generates a pressure in the input to the flow transducer that is a measure of the rate of flow through the relief valve, means coupling said flow transducer in a circuit of said servo system and said servo system including a pneumatic positioner for varying pump stroke, a pneumatic computing relay whose output controls said positioner, a variable manually operable pneumatic pressure regulator providing an input to said relay for commanding the stroke of the pump, and said flow transducer means including a pressure transducer providing an air signal to said relay to reduce said pump stroke command so as to minimize the flow of excess pressure fluid discharging through the pressure relief valve.

3. In a hydraulic transmission having a servo system controlling the stroke of a variable displacement pump and having a pressure relief valve to limit transmission pressure to a predetermined value, a flow transducer means including an input passage hydraulically connected to a passage having an opening in the discharge passage of the relief valve so that fluid discharging through the relief valve impinges upon said opening and generates a pressure in the input to the flow transducer that is a measure of the rate of flow through the relief valve, and means coupling said flow transducer in a circuit of said servo system, said servo system comprising pneumatic pump control means including a preset source of pneumatic signal pressure and an opposing source of pneumatic signal pressure varied by said flow transducer means in accordance with the flow of pressure fluid discharged through said pressure relief valve, and means responsive to the difference in said signal pressures to vary the stroke of the pump so as to minimize the flow of excess pressure fluid through the relief valve.

4. In a hydraulic transmission having a servo system controlling the stroke of a variable displacement pump and having a pressure relief valve to limit transmission pressure to a predetermined value, a flow transducer means including an input passage hydraulically connected to a passage having an opening in the discharge passage of the relief valve so that fluid discharging through the relief valve impinges upon said opening and generates a pressure in the input to the flow transducer that is a measure of the rate of flow through the relief valve, means coupling said flow transducer in a circuit of said servo system to cause the latter to reduce the stroke of the pump to minimize the flow of excess pressure fluid through the relief valve, and said flow transducer means including a cylinder having an operator piston urged in one direction by a spring, one end of said cylinder remote from said spring connected to said input passage, the other end of said cylinder connected to another passage in said relief valve that presents an opening that faces downstream of the flow of discharge fluid so that pressure transmitted therethrough to said cylinder assists said spring, whereby said operator piston is displaced against said spring in proportion to the rate of flow of fluid discharging through the pressure relief valve.

References Cited

UNITED STATES PATENTS

| | | |
|---|---|---|
| 2,238,060 | 4/1941 | Kendrick. |
| 2,472,477 | 6/1949 | Harrington et al. |
| 2,892,312 | 6/1959 | Allen et al. |
| 3,053,043 | 9/1911 | Knowler. |

EDGAR W. GEOGHEGAN, Primary Examiner